United States Patent [19]

Takiguchi

[11] Patent Number: 4,595,104

[45] Date of Patent: Jun. 17, 1986

[54] SORTING DEVICE

[75] Inventor: Kiyoaki Takiguchi, Yokohama, Japan

[73] Assignee: Computer Services Corporation, Tokyo, Japan

[21] Appl. No.: 627,883

[22] Filed: Jul. 5, 1984

[30] Foreign Application Priority Data

| Jul. 9, 1983 | [JP] | Japan | 58-124972 |
| Jul. 9, 1983 | [JP] | Japan | 58-124973 |
| Jul. 27, 1983 | [JP] | Japan | 58-137081 |

[51] Int. Cl.$^4$ .......................... B07C 1/10; B07C 5/04
[52] U.S. Cl. .................................. 209/548; 209/683
[58] Field of Search ............... 209/546, 548, 551, 680, 209/683, 684, 686, 687, 664, 288

[56] References Cited

U.S. PATENT DOCUMENTS

| 0,453,185 | 6/1891 | Gschwender | 209/683 X |
| 3,389,711 | 6/1968 | Slayton | 209/683 X |
| 4,123,352 | 10/1978 | Yamamoto et al. | 209/546 |
| 4,535,895 | 8/1985 | Takiguchi et al. | 209/683 |

FOREIGN PATENT DOCUMENTS

| 0091731 | 10/1983 | European Pat. Off. | 209/683 |
| 0949670 | 2/1964 | United Kingdom | 209/683 |

Primary Examiner—Robert B. Reeves
Assistant Examiner—Edward M. Wacyra
Attorney, Agent, or Firm—Koda and Androlia

[57] ABSTRACT

Each of sorting mechanisms on a sorter drum comprises a substantially trapezoidal slit defined in a cylindrical wall of the sorter drum and providing a substantially trapezoidal tongue displaced radially outwardly from the cylinderical wall, and a substantially trapezoidal guide body having a holder plate held against the trapezoidal tongue and a pair of slide webs bent from and extending along opposite side edges of the holder plate and fitted in the slit, the holder plate and the slide webs having edges projecting radially outwardly from the cylindrical wall and defining an opening in the cylindrical wall. A detector for detecting pieces sorted out is mounted on each collector guide extending around the sorter drum. An electric control circuit is responsive to a signal from the detector for automatically stopping a motor which rotates the sorter drum. The control circuit is also responsive to signals from detectors which detect pieces of different sizes for automatically stopping rotation in one direction of the motor and then, with a time delay, for automatically starting rotation in the opposite direction of the motor, so that the pieces of different sizes can automatically be sorted out without manual intervention.

7 Claims, 16 Drawing Figures

SORTING DEVICE

CROSS-REFERENCE TO RELATED APPLICATIONS

This application is related to Ser. No. 470,720, filed Feb. 28, 1983, now U.S. Pat. No. 4,535,895 and Ser. No. 491,580 filed May 4, 1983.

BACKGROUND OF THE INVENTION

The present invention relates to a sorting device for sorting out and classifying differently sized thin pieces such as tickets, metal pieces, coins, or other tokens according to their size.

Small articles of different sizes can manually be sorted out according to their size, but the manual sorting operation has been time-consuming and subjected to errors. Various automatic sorting mechanisms have heretofore been used for mechanically or electrically classifying and sorting out different kinds of pieces according to their size. Though the known automatic sorters are highly effective to sort out relatively heavy and thick objects such as coins or nuts, the mechanisms fail to divide relatively light and thin pieces into groups according to their size. No sorting device has been devoloped which is capable of sorting out light and thin articles without suffering from errors. It has therefore been customary practice to resort to manual procedures for sorting out pieces of paper such as tickets, pieces of cloth, or thin pieces of metal.

There has been proposed a sorting device (as disclosed in U. S. Pat. Application Ser. No. 470,720, now U.S. Pat. No. 4,535,895) comprising a rotatable sorter drum in the form of a hollow cylinder having a plurality of openings defined in the cylindrial wall thereof for discharging pieces of particular size only through the openings out of the sorter drum. The sorter drum has sorter mechanisms including tapered tonques sheared off the cylindrical wall radially outwardly thereof and guide strips extending along side edges of the tapered tongues, the openings being defined in the shape of rectangles by the tapered tongues and the guide strips, which jointly form discharge chutes leading to the openings. In operation, the sorter drum is rotated about its own axis to guide pieces in the sorter drum onto the chutes along the guide strips, and only those pieces smaller than the shape of the openings are allowed to pass through the openings out of the sorter drum. The prior sorting device has however been disadvantageous in that it is tedious and time-consuming to attach the guide strips securely in place along the side edges of the tapered tongues. It has been difficult to define openings of uniform shape, and hence to assemble uniformly designed sorting mechanisms. The assembling operation has mainly been carried out manually with utmost care over a long period of time.

In the proposed sorting device, the sorter drum is rotated by a motor, which will have to be manually turned off when all of pieces to be sorted out are discharged from the sorter drum. The sorting device has to be supervised by an operator who will stop or reverse the motor when all pieces are discharged to prevent unwanted power consumption or wear on moving parts. However, the cost of labor is high and the efficiency of operation of the sorter varies from operator to operator. There has been a growing demand for an automatic sorting device to achieve a more efficient sorting operation.

SUMMARY OF THE INVENTION

It is an object of the present invention to provide a sorting device including a sorter drum having a plurality of sorting mechanisms which can easily be machined and assembled and have uniformly dimensioned openings for discharging pieces therethrough.

Another object of the present invention is to provide a sorting device having a detecting mechanism for detecting whether pieces are discharged from sorting mechanisms to effect automatic control of the sorting device.

Still another object of the present invention is to provide a method of controlling a sorting device for automatically sorting out differently sized pieces.

According to the present invention, a plurality of sorting mechanisms are provided on a cylindrical wall of a rotatable sorter drum and arranged in rows in a circumferential direction of the cylindrical wall, each of the sorting mechanisms being composed of a substantially trapezoidal slit defined in said cylindrical wall and providing a substantially trapezoidal tongue displaced radially outwardly from the cylinderical wall, and a substantially trapezoidal guide body having a holder plate held against the trapezoidal tongue and a pair of slide webs bent from and extending along opposite side edges of said holder plate and fitted in the slit, the holder plate and the slide webs having edges projecting radially outwardly from the cylindrical wall and defining an opening in the cylindrical wall. A detector for detecting pieces sorted out is mounted on each collector guide extending around the sorter drum. A control circuit is responsive to a signal from the detector for automatically stopping a motor which rotates the sorter drum. The control circuit is also responsive to signals from detectors which detect pieces of different sizes for automatically stopping rotation in one direction of the motor and then, with a time delay, for automatically starting rotation in the opposite direction of the motor, so that the pieces of different sizes can automatically be sorted out without manual intervention.

The above and other objects, features and advantages of the present invention will become more apparent from the following description when taken in conjunction with the accompanying drawings in which preferred embodiments of the present invention are shown by way of illustrative example.

DETAILED DESCRIPTION

The present invention is particularly useful when embodied in a device as shown for sorting out rectangular pieces of paper such as tickets according to their size. However, the sorting device can also be used to sort out other thin, lightweight pieces or articles such as coins, pieces of cloth, or the like according to their size.

Figures 1, 2:
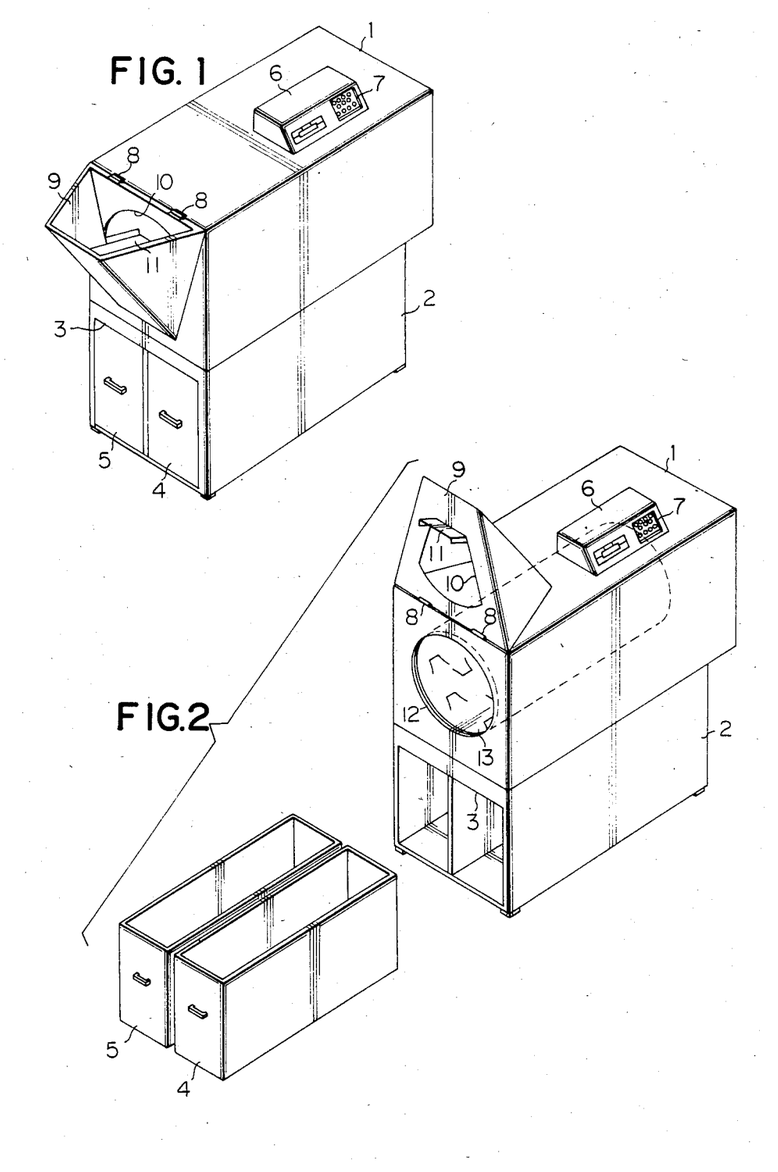
FIG. 1 is a perspective view of a sorting device according to the present invention.
FIG. 2 is a perspective view of the sorting device shown in FIG. 1 with collector boxes pulled out and a ticket charger lifted.

As illustrated in FIGS. 1 and 2, a sorting device comprises a body or frame 1 to which is integrally connected a leg 2 having therein a cavity 3 opening at one longitudinal end of the leg 2 through an area equal to a substantial portion of the area of the longitudinal end of the leg 2. A pair of collector boxes 4, 5 opening upwardly is removably disposed in the cavity 3. The frame 1 has on an upper surface thereof a control unit 6 having a control panel 7 supporting switches and lamps. A ticket charger 9 is pivotably connected by hinges 8 to an upper edge of one longitudinal end of the frame 1, the ticket charger 9 being of a triangle cross section. The ticket charger 5 has an upper trapezoidal opening and a charging hole 10 in its side which normally faces the frame 1. The ticket charger 5 also includes a slanted chute 11 extending through the charging hole 10 into the frame 1 when the ticket charger 5 is in the ticket charging position as shown in FIG. 1.

As shown in FIG. 2, the collector boxes 4, 5 can be pulled out, and the ticket charger 9 can be angularly moved to an upper position in which the ticket charger 9 is placed on an upper surface of the frame 1. The frame 1 has a circular opening 12 in the side thereof on which the ticket charger 9 is mounted. A sorter drum 13 is housed in the frame 1 and has an open end substantially in registry with the circular opening 12. When the ticket charger 9 is in the ticket charging position, the circular opening 12 is covered with the ticket charger 9 with the chute 11 of the ticket charger 9 extending through the circular opening 12 into the sorter drum 13. When the ticket charger 9 is lifted as shown in FIG. 2, the circular opening 12 is exposed to provide access into the sorter drum 13 therethrough.

Figure 3:
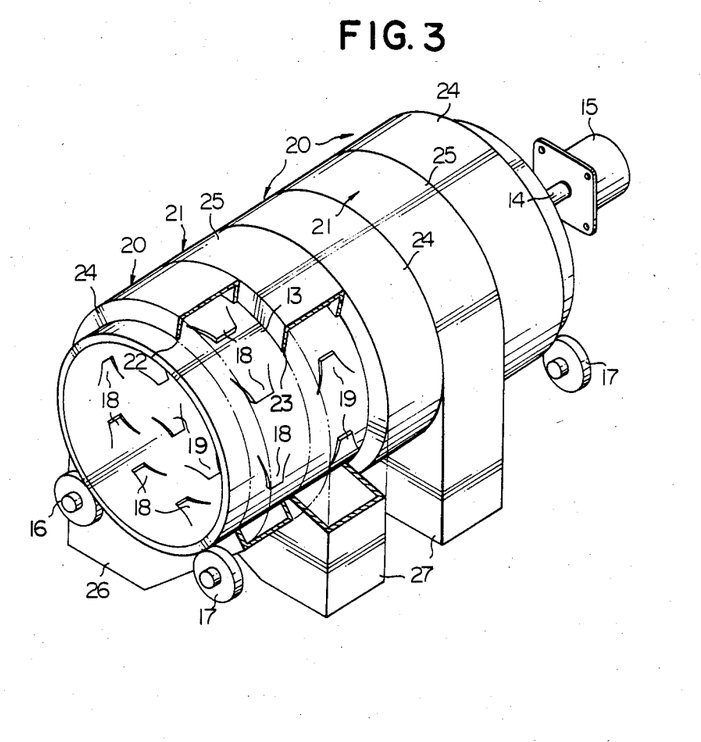
FIG. 3 is a perspective view of a sorter drum mounted in the sorting device shown in FIG. 1.

As illustrated in FIG. 3, the sorter drum 13 has a hollow cylindrical wall of thin metal sheet having one end open (lefthand as shown) and the other end closed off to which is concentrically connected a drive shaft 14 coupled to a motor 15. The sorter drum 13 has a central axis extending horizontally, and is rotatably supported by rollers 16, 17 laterally spaced from each other below the sorter drum 13, the rollers 16, 17 held in rolling engagement with the cylindrical wall of the sorter drum 13.

Figure 4:
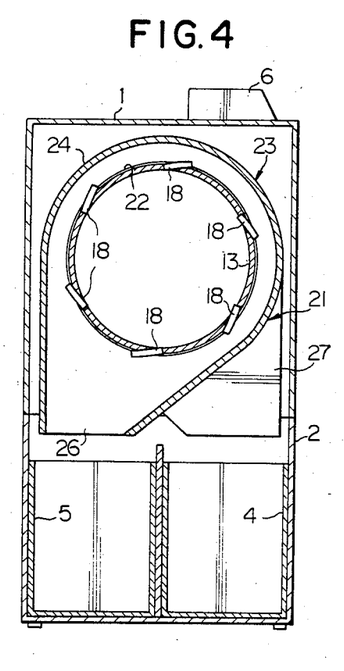
FIG. 4 is a transverse cross-sectional view of the sorting device shown in FIG. 1.

The sorter drum 13 has two types of sorting mechanisms 18, 19 on its cylindrical wall which are spaced in the cirumferential direction. In the illustrated embodiment, there are three annular rows of sorting mechanisms 18 with two annular rows of sorting mechanisms 19 alternating axially therewith. Alternate collector guides 20, 21 of a substantially inverted dropshaped configuration are disposed around the sorter drum 13, the collector guides 20 being positioned around the sorting mechanisms 18 and the collector guides 20 around the sorting mechanisms 19. The collector guides 20, 21 comprise hollow constructions including outer peripheral metal webs, and are composed of rings 24, 25 and chutes 26, 27 connected to and extending downwardly from the rings 24, 25, respectively. The rings 24, 25 are of a channel-shaped cross section defining circular openings 22, 23, respectively, and are positioned closely around the sorting mechanisms 18, 19, respectively. The chutes 26, 27 have guide walls extending tangentially to the rings 24, 25, one guide wall being directed vertically and the other guide wall inclined. The chutes 26, 27 have rectangular discharge outlets opening downwardly. As shown in FIG. 4, the discharge outlets of the chutes 26, 27 are staggered laterally. The collector boxes 4, 5 are disposed respectively below the chutes 26, 27.

Figure 5:
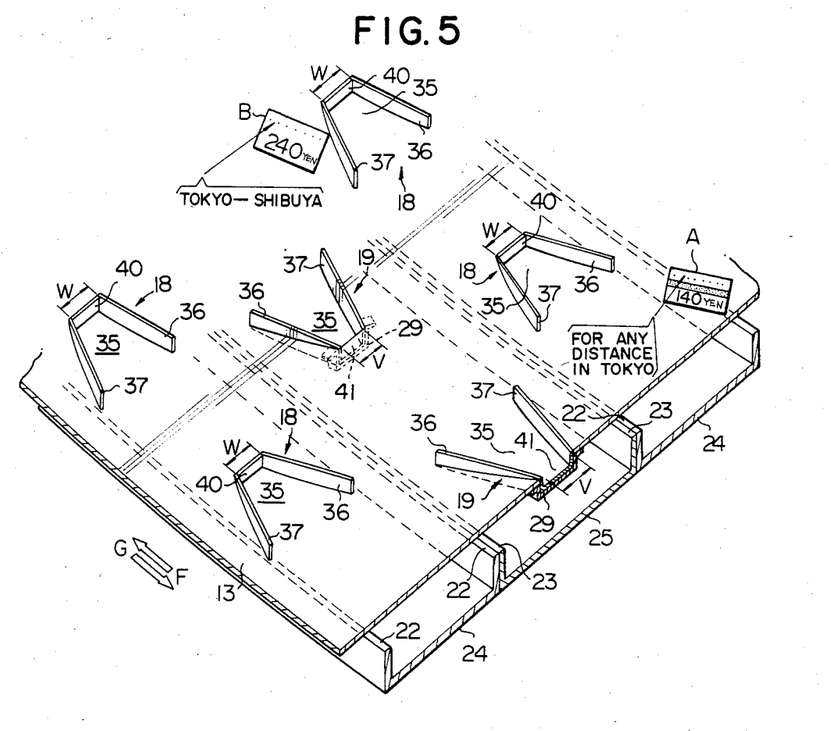
FIG. 5 is an enlarged fragmentary perspective view of the sorter drum of FIG. 3.

FIG. 5 illustrates the sorting mechanisms 18, 19 at an enlarged scale. Each of the sorting mechanisms 18, 19 is constructed by shearing the cylindrical wall of the sorter drum 13 and inserting guide bodies 28 (FIG. 6) in sheared slits. The sorting mechanisms 18, 19 are oriented in opposite directions.

Figure 6:
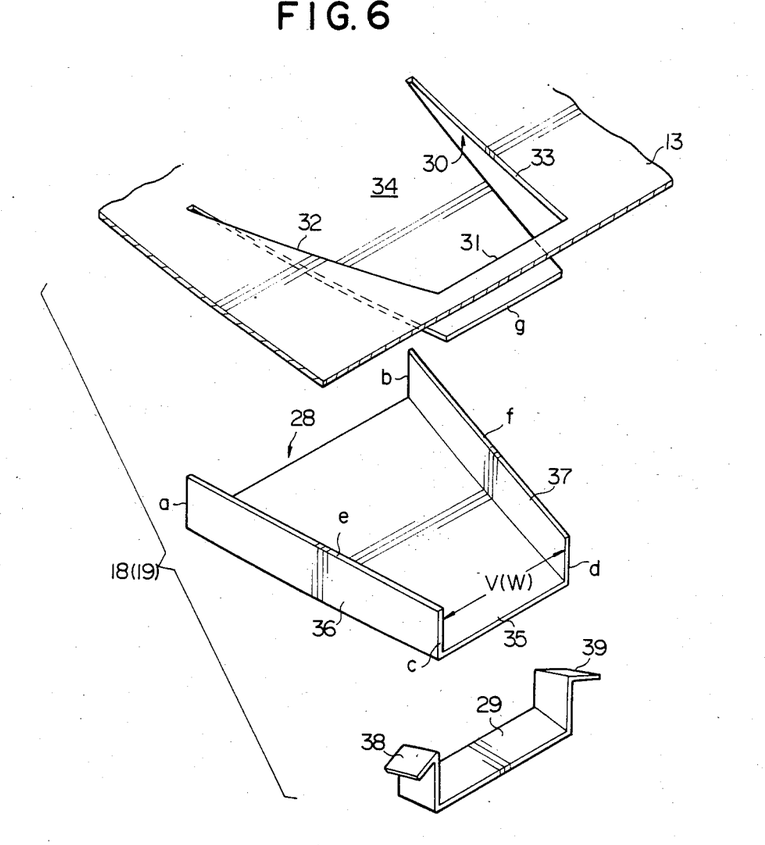
FIG. 6 is an enlarged exploded perspective view of a sorting mechanism.
Figure 7:
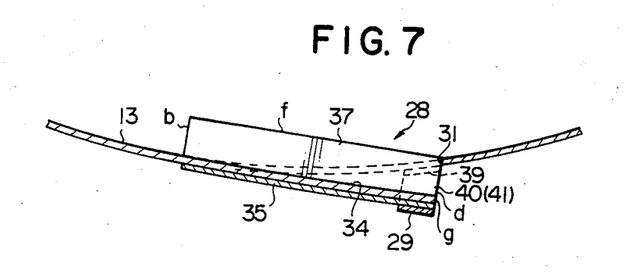
FIG. 7 is a cross-sectional view of the sorting mechanism as assembled.
Figure 8:
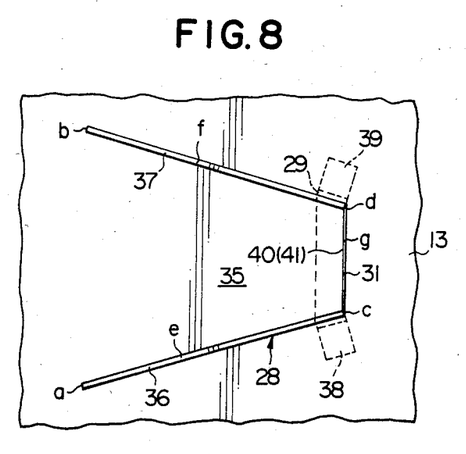
FIG. 8 is a fragmentary plan view of the sorting mechanism of FIG. 7.

FIG. 6 shows one of the sorting mechanisms 18, 19 as exploded. Each sorting mechanisms 18, 19 is composed of the sorter drum 13, the guide body 28, and a fixing band 29. More specifically, the sorter drum 13 has a slit 30 having a width equal to the thickness of the guide body 28 and defined by a straight top edge 31 and straight side edges 32, 33. The top edge 31 extends normally to the direction in which the sorter drum 13 rotates, and the side edges 32, 33 have one end joined to both ends of the top edge 31, with the other ends of the side edges 32, 33 being spread away from each other. Thus, the slit 30 has a trapezoidal shape defined by the top and side edges 31, 32, 33. The slit 30 forms a trapezoidal or tapered tongue 34 sheared off the cylindrical wall radially outwardly of the sorter drum 13.

Figure 9:
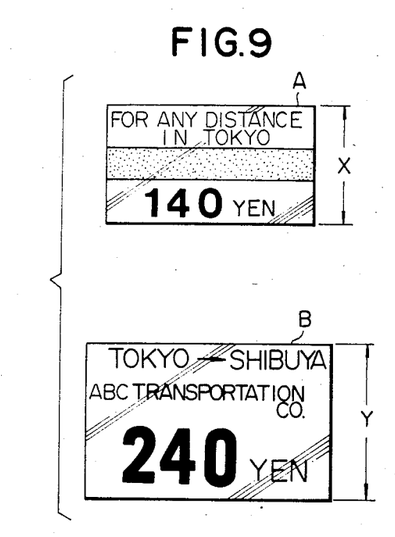
FIG. 9 is a view showing pieces to be sorted out by the sorting device.
Figure 10:
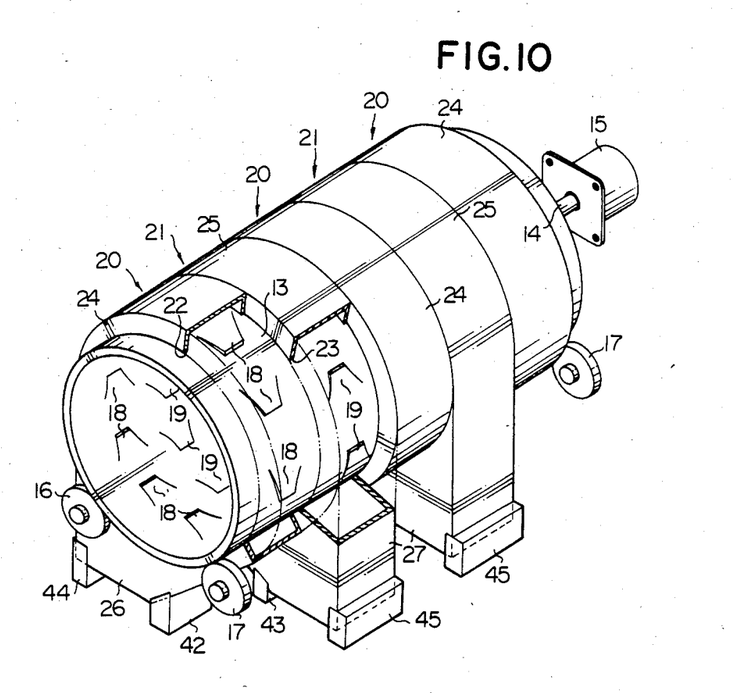
FIG. 10 is a perspective view of a sorter drum according to another embodiment of the present invention.
Figure 11:
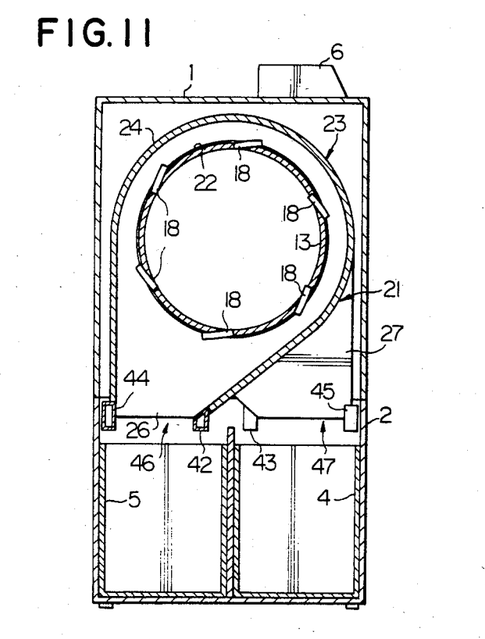
FIG. 11 is a transverse cross-sectional view of a sorting device in which the sorting drum of FIG. 10 is incorporated.

The guide body 28 can be pressed out of a single thin metal sheet. The guide body 28 comprises a holder plate 35 and a pair of upstanding slide webs 36, 37 extending along slanted lateral edges of the holder plate 35. The holder plate 35 is of a trapezoidal shape having the same size as that of the tongue 34. The holder plate 35 has a central portion curved slightly with its radius of curvature equal to that of the tongue 34 so that the holder plate 35 will be held in intimate contact with the tongue 34. The slide webs 36, 37 have the same width and extend rectilinearly. The closer ends of the slide webs 36, 37 are spaced from each other by a distance V or W. More specifically, the closer ends of the slide webs 36, 37 are spaced by the distance V in the sorting mechanism 19, while the closer ends of the slide webs 36, 37 are spaced by the distance W in the sorting mechanism 18. The distances V, W are selected such that the distance V is greater than a width X of a uniform-fare ticket A (FIG. 9) and slightly smaller than a width Y of an ordinary ticket B. The fixing band 29 is bent from a thin web of metal into a channel shape substantially equal to the outer profile of the smaller end of the guide body 28. The bent end portions of the fixing band 29 have respective legs 38, 39 bent away from each other.

For assembling the sorting mechanisms 18, 19, the trapezoidal tongue 34 is bent slightly radially outwardly of the sorter drum 13, and the slide webs 36, 37 of the guide body 28 are fitted into the slit 30. With the outer side of the tongue 34 being held intimately against the inner side of the holder plate 35, the tongue 34 and the holder plate 35 are secured to each other by spot welding or adhesive. The fixing band 29 is fitted over the smaller end of the trapezoidal guide body 28. The central portion of the fixing band 29 is secured to the guide body 28 with the legs 38, 39 fixed to an outer peripheral surface of the sorter drum 13. The slide webs 36, 37 have remotely spaced edges a, b projecting radially inwardly (upwardly in FIG. 6) of the sorter drum 13, and closer edges c, d projecting radially outwardly (downwardly in FIG. 6) of the sorter drum 13. Thus, the slide webs 36, 37 have longitudinal edges e, f extending obliquely to the inner peripheral surface of the sorter drum 13. Accordingly, there is provided a trapezoidal chute extending between the slide webs 36, 37 projecting upwardly along the side edges of the tongue 34. The top edge g of the tongue 34, the end edges of the slide webs 36, 37, and the top edge 31 of the slit 30 jointly define a rectangular discharge opening 40 (41) having the width V (W). The rings 24, 25 of the collector guides 20, 21 are positioned around the sorting mechanisms 18, 19 and supported by a support (not shown) other than the support by which the sorter drum 13 is supported.

Operation of the sorting device thus constructed is as follows: According to the illustrated embodiment, two kinds of tickets A, B of different sizes (FIG. 9), one being a uniform-fare ticket A having a width X and the other an ordinary ticket B having a width Y are to be sorted out and classified. For sorting out the tickets A, the sorting device is set as shown in FIG. 1, and a mixture of tickets A, B is introduced through the upper opening of the ticket charger 9 down the chute 11 into the sorter drum 13 in the frame 1. Then, the start switch on the control panel 7 is turned on to start the motor 15 which rotates the drive shaft 14 to rotate the sorter drum 13 in the direction of the arrow F (FIG. 5), in which the ends a, b of the slide webs 36, 37 lead the discharge openings 41. The mixed tickets A, B are collected at a lower portion in the sorter drum 13 as they slide and tumble therein, and are gathered by the slide webs 36, 37 toward the discharge opening 41. More specifically, the tickets A, B irrespective of their sizes slide on the inner peripheral surface of the sorter drum 13 and are guided by the slide webs 36, 37 down the chute therebetween toward the discharge opening 41. The tickets A, B are caused to flow centrally into the sorting mechanisms 19 and are all collected between the slide webs 36, 37. Although the tickets A, B flow down the tongue 34 toward the discharge opening 41, only tickets A of a smaller size are permitted to flow through the openings 41 out of the sorter drum 13 as the openings 41 are dimensioned to allow the tickets A to pass longitudinally therethrough. The tickets B, which are larger than the tickets A, are large enough to be rejected by the openings 41, and either get caught by the slide webs 36, 37 before reaching the openings 41 or are forced to flow over the openings 41, so that the tickets B will remain in the sorter drum 13 without being discharged. The tickets A as discharged through the discharge openings 41 out of the sorter drum 13 enter the channel-shaped rings 25 of the collector guides 21, slide along the inner peripheral surfaces of the rings 25, and fall by gravity down the chutes 27 through the discharge outlets into the collector box 4.

When the tickets B are left in the sorter drum 13 after the tickets A have thus been discharged out, the motor 15 is de-energized by a timer switch (not shown), and then reversed by operating on the control panel 7 to rotate the sorter drum 13 in the direction of the arrow G (FIG. 5), thus causing the tickets B to slide and tumble in the sorter drum 13. The tickets B are then moved centrally into the sorting mechanisms 18 and gathered between the slide webs 36, 37. The tickets B are now discharged through the discharge openings 40 out of the sorter drum 13, and enter the rings 24 of the collector guides 20 in which the tickets B slide down the inner peripheral surfaces of the rings 24. The tickets B are then allowed to fall by gravity down the chutes 26 through the discharge outlets into the collector box 5.

Accordingly, only the tickets A are collected in the collector box 4 while only the tickets B are collected the collector box 5. Thus, the tickets A, B can be sorted out and classified by rotating the sorter drum 13.

The motor 15 is stopped by the timer switch to stop the rotation of the sorter drum 13. At this time, only paper pieces, bills, and defective tickets, if any, remain in the sorter drum 13. The sorting device now needs to be cleaned in preparation for a next sorting cycle. The collector boxes 4, 5 are pulled out, and the tickets A, B are transferred into other storage boxes which are separately held in storage. The stored tickets A, B will be burned or shredded at a later time. The ticket charger 9 is angularly moved upwardly about the hinges 8 as shown in FIG. 2 to expose the opening 12, through which a hand or a vacuum suction unit is inserted into the sortor drum 13 for removing any pieces or tickets that cannot be sorted out through the rotation of the sorter drum 13. The removed pieces and tickets are then stored separately from the classified tickets A, B. Thereafter, the collector boxes 4, 5 are inserted again into the sorting device, and the ticket charger 9 is turned down about the hinges 8. The sorting device is now set to the condition of FIG. 1 in readiness for another cycle of sorting out different tickets.

FIGS. 10 through 14 show a sorting device according to another embodiment of the present invention. The sorting device of FIGS. 10 through 13 differ from the sorting device of FIGS. 1 through 8 in that the chutes 26, 27 of the collector guides 20, 21 support thereon light-emitting devices 42, 43 and photodetectors 44, 45 spaced therefrom across the discharge outlets of the chutes 26, 27. The light-emitting device 42 and the photodetector 44 are paired, and the light-emitting device 43 and the photodetector 45 are paired.

Figure 12:
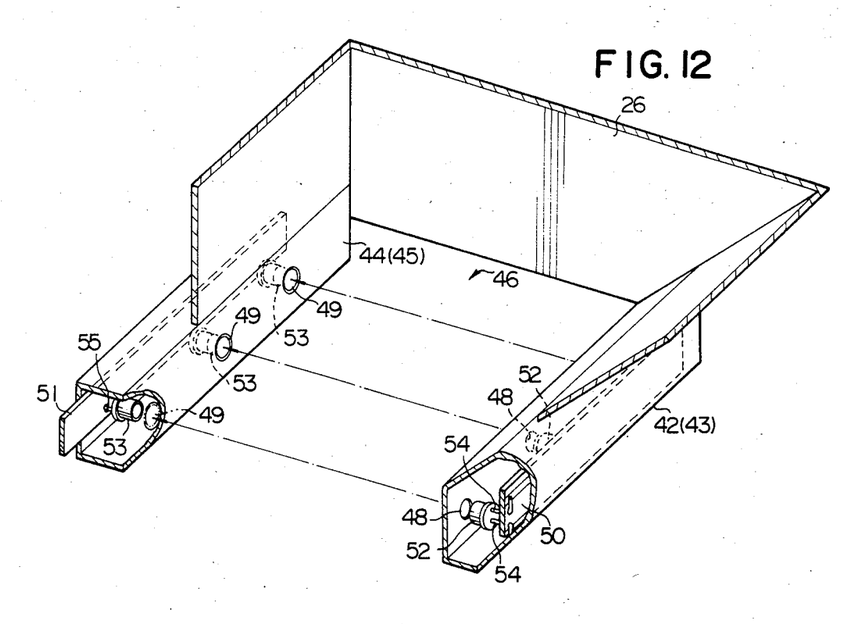
FIG. 12 is an enlarged perspective view, partly cut away, of a discharge outlet.
Figure 13:
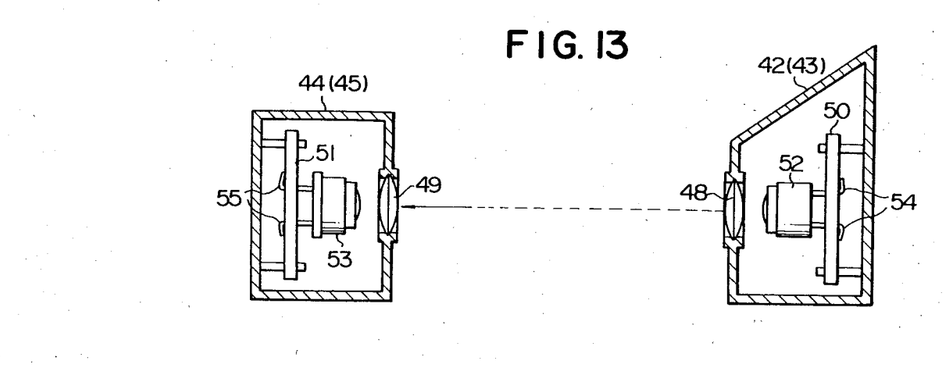
FIG. 13 is a cross-sectional view of a detecting mechanism composed of a light-emitting element and a photodetector.

As shown in FIGS. 12 and 13, each of the light-emitting devices 42, 43 and the photodetectors 44, 45 is of a hollow elongated construction made of a thin sheet having a length substantially the same as that of the confronting edges of discharge outlets 46, 47 of the chutes 26, 27. (FIGS. 12 and 13 only show the chute 26.) The confronting walls of the light-emitting device 42 and the photodetector 44 have windows spaced at intervals along the lengths thereof and holding therein lenses 48, 49 facing each other. The light-emitting device 42 and the photodetector 44 have elongated support plates 50, 51 disposed therein and supporting thereon light-emitting elements 52 and photodetector elements 53 which are spaced at intervals along the length of the support plates 50, 51 and disposed in confronting relation to the lenses 48, 49, respectively. The support plates 50, 51 are made of an insulating material such as a printedcircted board, the light-emitting elements 52 and the photodetector elements 53 having pins 54, 55 soldered to the support plates 50, 51.

Figure 14:
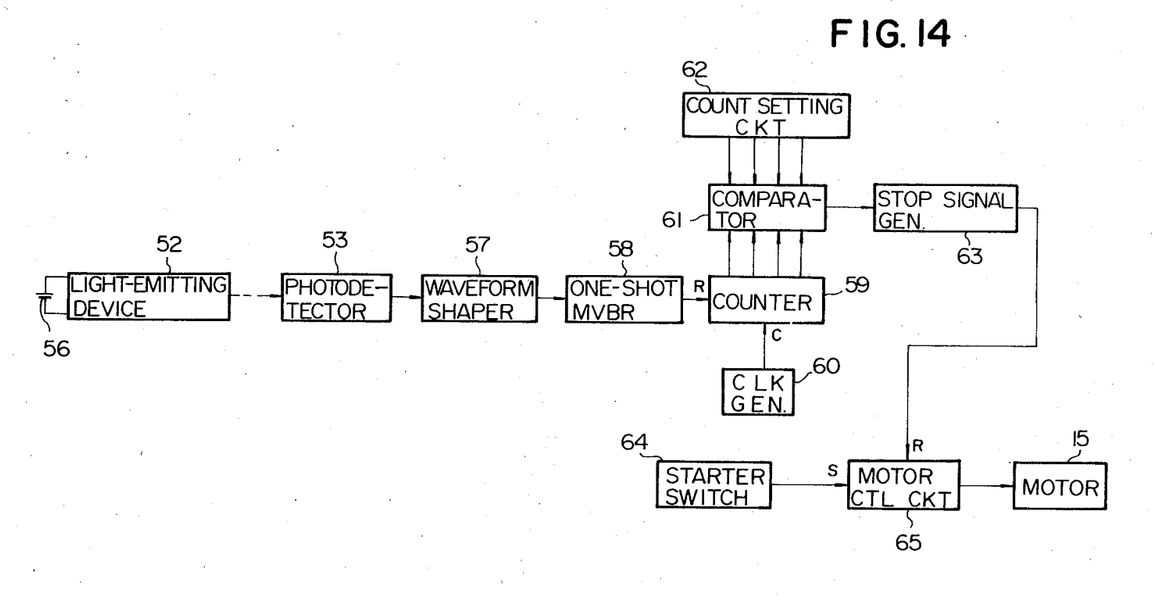
FIG. 14 is a block diagram of a motor control system.

FIG. 14 illustrates a control circuit for controlling the motor 15 in response to a signal from the photodetector element 53. The light-emitting element 52 is energized by a battery 56 connected thereto. The photodetector element 53 is coupled to a waveform shaper 57 connected to a one-shot multivibrator 58 having an output terminal connected to a reset terminal R of a counter 59. A clock generator 60 for producing a pulse at each of predetermined intervals is connected to a count terminal C of the counter 59, which has output terminals connected to a comparator 61. A count setting circuit 62 for freely setting a count is connected to the comparator 61. The comparator 61 has an output terminal coupled to a stop signal generator 63 connected to a reset terminal R of a motor control circuit 65. The control panel 7 has a starter switch 64 for starting the control of the motor 15, the starter switch 64 being connected to a set terminal S of the motor control circuit 65, which is coupled to the motor 15.

Operation of the sorting device shown in FIGS. 10 through 14 is substantially the same as that of the sorting device of FIGS. 1 through 8 except that the motor 15 is controlled by the control circuit illustrated in FIG. 14. After the tickets A, B have been charged into the sorter drum 13, the starter switch 64 on the control panel 7 is turned on to set the motor control circuit 65 to start the motor 15. While the sorting device is in operation, each light-emitting element 52 is energized to emit light which is changed by the lens 48 into parallel beams of light which enter the photodetector element 53 through the lens 49. Therefore, a plurality of parallel light beams are formed in the discharge outlet 46. If no object passing through the discharge outlet 46, the light beams from each light-emitting element 52 fall on the corresponding photodetector element 53. When a ticket A falls through the discharge outlet 46, it cuts off the light beam from one of the light-emitting elements 52 to enable the photodetector element 53 to detect the ticket A. The clock generator 60 supplies pulses periodically to the count terminal C of the counter 59. When a ticket A blocks the light beam, the photodetector element 53 issues a signal through the waveform shaper 57 to the one-shot multivibrator 58 which then applies one pulse wave to the reset terminal R of the counter 59 to reset the same. The counter 59 counts clock pulses from the clock generator 60 during a time interval from the time when the counter 59 is reset to the time when the light beam entering the photodetector element 53 is cut off again. A count output from the counter 59 is applied to the comparator 61 which compares the count output with a predetermined count preset by the count setting circuit 62. If the light beam entering the photodetector element 53 is cut off again, then the one-shot multivibrator 58 resets the counter 59 again, which starts counting clock pulses from "0". Therefore, as long as a number of tickets A to be sorted out are successively discharged through the discharge outlet 46, the counter 59 is frequently reset before its count reaches the preset count from the count setting circuit 62, and hence the comparator 61 issues no signal to the stop signal generator 63. As fewer tickets A are discharged as the sorting operation progresses, the count of the counter 59 increases. When the light beam is not cut off for a predetermined interval of time after the final ticket A has been discharged, the count of the counter 59 reaches the preset count by the count setting circuit 62, whereupon the comparator 61 issues a signal to the stop signal generator 63 which then applies a stop signal to reset the motor control circuit 65, thus stopping the rotation of the motor 15. The operation to sort out the tickets A is now automatically brought to an end. Then, another starter switch on the control panel 7 is depressed to rotate the motor 15 in the opposite direction of the arrow F (FIG. 5) to sort out the tickets B. When all of the tickets B have been discharged, the motor 15 is stopped by the control circuit in the same manner as described above.

Figure 15:
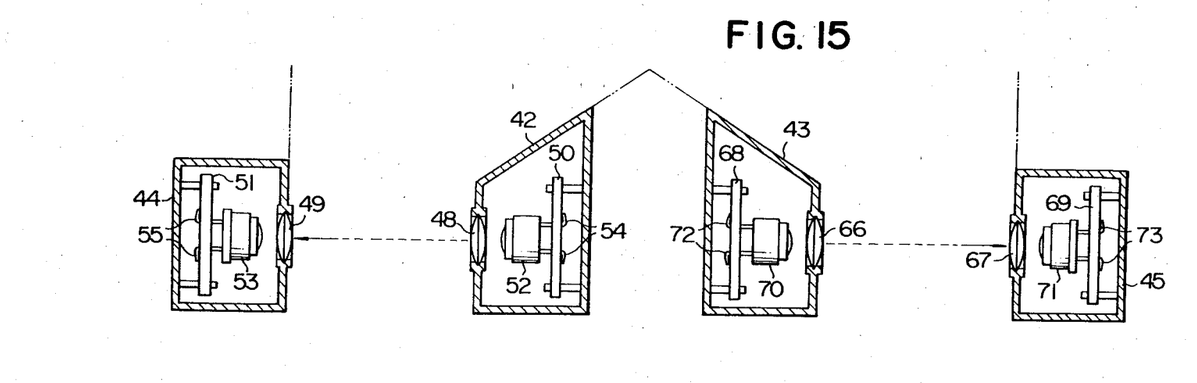
FIG. 15 a cross-sectional view of a pair of detecting mechanisms.
Figure 16:
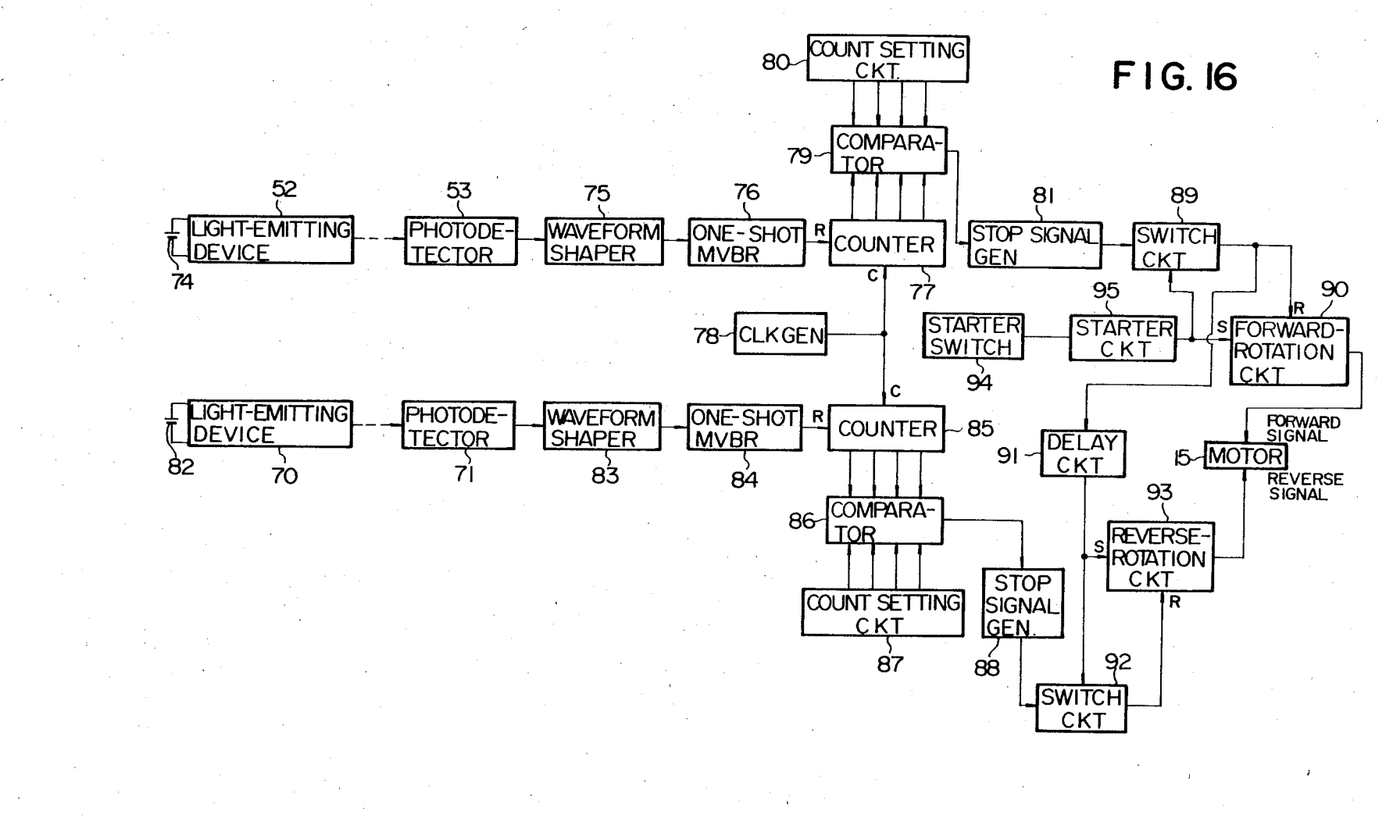
FIG. 16 is a block diagram of a motor control system according to another embodiment.

FIGS. 15 and 16 are illustrative of a control circuit according to another embodiment of the present invention. As shown in FIG. 15, the light-emitting device 42 and the photodetector 44 are paired and constructed in the same manner as shown in FIG. 13, and another pair of the light-emitting device 43 and the photodetector 45 is also of the same arrangement as that of the light-emitting device 42 and the photodetector 44. More specifically, each of the light-emitting devices 43 and the photodetector 45 is of a hollow elongated construction made of a thin sheet having a length substantially the same as that of the confronting edges of the discharge outlets 47 of the chute 27. The confronting walls of the light-emitting device 43 and the photodetector 45 have windows spaced at intervals along the lengths thereof and holding therein lenses 66, 67 facing each other. The light-emitting device 43 and the photodetector 45 have elongated support plates 68, 69 disposed therein and supporting thereon light-emitting elements 70 and photodetector elements 71 which are spaced at intervals along the length of the support plates 68, 69 and disposed in confronting relation to the lenses 66, 67, respectively. The support plates 68, 69 are made of an insulating material such as a printedcircted board, the light-emitting elements 70 and the photodetector elements 71 having pins 72, 73 soldered to the support plates 68, 69.

The control circuit shown in FIG. 16 serves to control the motor 15 in response to signals from the photodetector elements 53, 71. The control circuit include batteries 74, 82, the light-emitting elements 72, 70, the photodetector elements 53, 71, waveform shapers 75, 83, one-shot multivibrators 76, 84, counters 77, 85, comparators 79, 86, count setting circuits 80, 87, a clock generator 78, and stop signal generators 81, 88, all connected in the same manner as the corresponding components of the control circuit shown in FIG. 14. The control circuit of FIG. 16 also includes switch circuits 89, 92 connected to output terminals of the stop signal generators 81, 88, respectively. The switch circuit 89 has an output terminal connected to a reset terminal R of a forward-rotation control circuit 90 connected to the motor 15. A starter switch 94 on the control panel 7 (FIGS. 1 and 2) is connected through a starter circuit 95 to the switch circuit 89 and a set terminal S of the forward-rotation control circuit 90. The output terminal of the switch circuit 89 is connected via a delay circuit 91 to the switch circuit 92, which has an output terminal coupled to a reset terminal R of a reverse-rotation control circuit 93 connected to the motor 15. The delay circuit 91 serves to delay an applied signal for a few seconds to a few tens of seconds and is also connected to a set terminal S of the reverse-rotation control circuit 93.

The control circuit shown in FIG. 16 will operate as follows: After the tickets A, B have been charged into the sorter drum 13, the starter switch 94 on the control panel 7 is turned on to enable the starter circuit 95 to issue a start signal to close the switch circuit 89 and set the forward-rotation control circuit 90 which applies a normal-rotation signal to the motor 15 to rotate the motor 15 to in the direction of the arrow G (FIG. 5). The sorting device now starts sorting out the tickets A. While the sorting device is in operation, the light-emitting elements 52, 70 are energized to emit light which is changed by the lenses 48, 66 into parallel beams of light which enter the photodetector elements 53, 71 through the lenses 49, 67. Therefore, a plurality of parallel light beams are formed in the discharge outlets. If no object passing through the discharge outlets, the light beams from the light-emitting elements 52, 70 fall on the corresponding photodetector elements 53, 71. When a ticket A falls through the discharge outlet, it cuts off the light beam from one of the light-emitting elements 52 to enable the photodetector element 53 to detect the ticket A. The clock generator 78 supplies pulses periodically to the count terminal C of the counter 77. When a ticket A blocks the light beam, the photodetector element 53 issues a signal through the waveform shaper 75 to the one-shot multivibrator 76 which then applies one pulse wave to the reset terminal R of the counter 77 to reset the same. The counter 77 counts clock pulses from the clock generator 78 during a time interval from the time when the counter 77 is reset to the time when the light beam entering the photodetector element 53 is cut off again. A count output from the counter 77 is applied to the comparator 79 which compares the count output with a predetermined count preset by the count setting circuit 80. If the light beam entering the photodetector element 53 is cut off again, then the one-shot multivibrator 76 resets the counter 77 again, which starts counting clock pulses from "0". Therefore, as long as a number of tickets A to be sorted out are successively discharged through the discharge outlet, the counter 77 is frequently reset before its count reaches the preset count from the count setting circuit 80, and hence the comparator 79 issues no signal to the stop signal generator 81. As fewer tickets A are discharged as the sorting operation increases, the count of the counter 77 increases. When the light beam is not cut off for a predetermined interval of time after the final ticket A has been discharged, the count of the counter 77 reaches the preset count by the count setting circuit 80, whereupon the comparator 79 issues a signal to the stop signal generator 81 which then applies a stop signal through the switch circuit 89 to the reset terminal R of the forward-rotation control circuit 90, thus resetting the same and stopping the rotation of the motor 15. The operation to sort out the tickets A is now automatically brought to an end.

The stop signal from the stop signal generator 81 is also applied to the delay circuit 91 which will deliver the applied signal with a time delay of a few seconds to a few tens of seconds to the switch circuit 92 to close the same. The delayed signal is also applied to the set terminal S of the reverse-rotation control circuit 93 which then feeds a reverse-rotation signal to the motor 15 to rotate the same in the reverse direction of the arrow F (FIG. 5), whereupon the tickets B start being sorted out. When a ticket B falls through the discharge outlet, it cuts off the light beam from one of the light-emitting elements 70 to enable the photodetector element 71 to detect the ticket B. The clock generator 78 supplies pulses periodically to the count terminal C of the counter 85. When a ticket A blocks the light beam, the photodetector element 71 issues a signal through the waveform shaper 83 to the one-shot multivibrator 84 which then applies one pulse wave to the reset terminal R of the counter 85 to reset the same. The counter 85 counts clock pulses from the clock generator 78 during a time interval from the time when the counter 85 is reset to the time when the light beam entering the photodetector element 71 is cut off again. A count output from the counter 85 is applied to the comparator 86 which compares the count output with a predetermined count preset by the count setting circuit 87. If the light beam entering the photodetector element 71 is cut off again, then the one-shot multivibrator 84 resets the counter 85 again, which starts counting clock pulses from "0". Therefore, as long as a number of tickets B to be sorted out are successively discharged through the discharge outlet, the counter 85 is frequently reset before its count reaches the preset count from the count setting circuit 87, and hence the comparator 86 issues no signal to the stop signal generator 88. As fewer tickets B are discharged as the sorting operation progresses, the count of the counter 85 increases. When the light beam is not cut off for a predetermined interval of time after the final ticket B has been discharged, the count of the counter 85 reaches the preset count by the count setting circuit 87, whereupon the comparator 86 issues a signal to the stop signal generator 88 which then applies a stop signal through the switch circuit 92 to the reset terminal R of the reverse-rotation control circuit 93, thus resetting the same and stopping the rotation of the motor 15. The operation to sort out the tickets B is now automatically finished.

Therefore, the motor 15 is automatically de-energized successively after it has rotated in the directions of the arrows F, G.

Although certain preferred embodiments have been shown and described, it should be understood that many changes and modifications may be made therein without departing from the scope of the appended claims.

What is claimed is:

1. A device for sorting out a multiplicity of pieces according to their size, comprising:
   a frame;
   a sorter drum rotatably mounted in said frame for storing therein pieces having different sizes to be sorted out, said sorter drum having a cylindrical wall;
   a plurality of sorting mechanisms on said cylindrical wall and arranged in rows in a circumferential direction of said cylindrical wall, each of said sorting mechanisms being composed of a substantially trapezoidal slit defined in said cylindrical wall and providing a substantially trapezoidal tongue displaced radially outwardly from said cylinderical wall, and a substantially trapezoidal guide body having a holder plate held against said trapezoidal tongue and a pair of slide webs bent from and extending along opposite side edges of said holder plate and fitted in said slit, said holder plate and said slide webs having edges projecting radially outwardly from said cylindrical wall and defining an opening in said cylindrical wall;

means for rotating said sorter drum about its own axis to cause the pieces of the particular size to be discharged through said openings out of said sorter drum.

2. A sorting device according to claim 1, wherein each of said sorting mechanisms includes a fixing band fitted over said guide body adjacent to said opening and having a pair of legs fixed to said cylindrical wall on an outer peripheral surface thereof.

3. A device for sorting out a multiplicity of pieces according to their size, comprising:

a frame;

a sorter drum rotatably mounted in said frame for storing therein pieces having different sizes to be sorted out;

a plurality of sorting mechanisms on said sorter drum and arranged in rows in a circumferential direction thereof, said sorting mechanisms having openings to allow pieces of different sizes to pass therethrough;

means for rotating said sorter drum about its own axis to cause the pieces to be discharged through said openings out of said sorter drum;

a plurality of collector guides disposed around said sorter drum in radial alignment with said rows of said sorting mechanisms for guiding the discharged pieces through discharge outlets of the collector guides;

detectors mounted on said collector guides adjacent to said discharge outlets for detecting passage of pieces through said collector guides; and an electric control circuit responsive to a signal from said detectors which is indicative of absence of any pieces in said discharge outlets for de-energizing said rotating means.

4. A device according to claim 3, wherein each of said detectors comprises a light-emitting element and a photodetector element mounted on one of said collector guides in confronting relation to each other across the discharge outlet thereof, said electric control circuit comprising a clock pulse generator for generating clock pulses, a counter for counting the clock pulses, means responsive to a signal from said photodetector element indicative of passage of a piece through said discharge outlet for resetting said counter, a count setting circuit for presetting a count, a comparator for comparing a count from said counter with the preset count from said count setting circuit and producing an output signal when said count from said counter has reached said preset count, a stop signal generator for generating a stop signal in response to the output signal from said comparator, and a control circuit for de-energizing said rotating means in response to the stop signal from said stop signal generator.

5. A device for sorting out a multiplicity of pieces according to their size, comprising:

a frame;

a sorter drum rotatably mounted in said frame for storing therein pieces having different sizes to be sorted out;

a plurality of first and second sorting mechanisms on said sorter drum and arranged in rows in a circumferential direction thereof, said sorting mechanisms having openings of different sizes to allow pieces of different sizes to pass therethrough, respectively;

a motor for reversibly rotating said sorter drum about its own axis to cause the pieces to be discharged through said openings out of said sorter drum;

a plurality of first and second collector guides disposed around said sorter drum in radial alignment with said rows of said first and second sorting mechanisms for guiding the discharged pieces through discharge outlets of the first and second collector guides;

first and second detectors mounted respectively on said first and second collector guides adjacent to said discharge outlets for detecting passage of pieces through said first and second collector guides; and an electric control circuit for stopping rotation of said motor in one direction in response to a signal from said first detector indicative of absence of any pieces in said discharge outlet of said first collector guide, for rotating said motor automatically in an opposite direction with a time delay after said motor has been stopped, and for subsequently stopping rotation of said motor in said opposite direction in response to a signal from said second detector indicative of absence of any pieces in said discharge outlet of said second collector guide.

6. A device according to claim 5, wherein said first detector comprises a first light-emitting element and a first photodetector element mounted on said first collector guide in confronting relation to each other across the discharge outlet thereof, said second detector comprises a second light-emitting element and a second photodetector element mounted on said second collector guide in confronting relation to each other across the discharge outlet thereof, said electric control circuit comprising a clock pulse generator for generating clock pulses, a first counter for counting the clock pulses, first means responsive to a signal from said first photodetector element indicative of passage of a piece through said discharge outlet for resetting said first counter, a first count setting circuit for presetting a first count, a first comparator for comparing a count from said first counter with the first preset count from said first count setting circuit and producing an output signal when said count from said first counter has reached said first preset count, a first stop signal generator for generating a stop signal in response to the output signal from said first comparator, a first motor control circuit for stopping rotation of said motor in said one direction in response to the stop signal from said first stop signal generator, a second counter for counting the clock pulses, second means responsive to a signal from said second photodetector element indicative of passage of a piece through said discharge outlet for resetting said second counter, a second count setting circuit for presetting a second count, a second comparator for comparing a count from said second counter with the second preset count from said second count setting circuit and producing an output signal when said count from said second counter has reached said second preset count, a second stop signal generator for generating a stop signal in response to the output signal from said second comparator, a second motor control circuit for stopping rotation of said motor in said opposite direction in response to the stop signal from said second stop signal generator, and a delay circuit responsive to the stop signal from said first stop signal generator for applying a delay signal to said second motor control circuit to rotate said motor in said opposite direction with said time delay after said motor has been stopped in said one direction.

7. A method of controlling a device for sorting out a multiplicity of pieces according to their size, said device comprising a rotatable sorter drum for storing therein pieces having different sizes to be sorted out, a plurality of sorting mechanisms on said sorter drum and arranged in rows in a circumferential direction thereof, said sorting mechanisms having openings to allow pieces of different sizes to pass therethrough, means for rotating said sorter drum about its own axis to cause the pieces of the particular size to be discharged through said openings out of said sorter drum, and a plurality of collector guides disposed around said sorter drum in radial alignment with said rows of said sorting mechanisms for guiding the discharged pieces through discharge outlets of the collector guides, said method comprising the step of:

de-energizing said rotating means to stop rotation of said sorter drum when there is no piece discharged from said discharge outlets upon elapse of a given period of time after a piece has been discharged from said discharge outlets.

* * * * *